US007574395B2

(12) United States Patent
Sweeting

(10) Patent No.: US 7,574,395 B2
(45) Date of Patent: Aug. 11, 2009

(54) PRICE IMPROVEMENT IN AN ACTIVE TRADING MARKET

(75) Inventor: Michael Sweeting, Aldershot (GB)

(73) Assignee: BGC Partners, Inc., Wilmington, DE (US)

( * ) Notice: Subject to any disclaimer, the term of this patent is extended or adjusted under 35 U.S.C. 154(b) by 1644 days.

(21) Appl. No.: 10/171,009

(22) Filed: Jun. 11, 2002

(65) Prior Publication Data

US 2006/0229967 A1      Oct. 12, 2006

(51) Int. Cl.
    *G06Q 40/00*      (2006.01)
(52) U.S. Cl. .................... 705/37; 705/38; 705/36; 705/35
(58) Field of Classification Search .............. 705/37, 705/36, 38
    See application file for complete search history.

(56) References Cited

U.S. PATENT DOCUMENTS

| | | | | |
|---|---|---|---|---|
| 5,905,974 | A | | 5/1999 | Fraser et al. ................ 705/37 |
| 6,021,397 | A | * | 2/2000 | Jones et al. ................ 705/36 R |
| 7,212,999 | B2 | * | 5/2007 | Friesen et al. ............... 705/37 |
| 2001/0042785 | A1 | * | 11/2001 | Walker et al. .............. 235/379 |
| 2004/0117302 | A1 | * | 6/2004 | Weichert et al. ............. 705/40 |

FOREIGN PATENT DOCUMENTS

| | | |
|---|---|---|
| WO | WO 97/08640 | 3/1997 |
| WO | WO 00/38093 | 6/2000 |
| WO | WO 00/57307 | 9/2000 |

OTHER PUBLICATIONS

DOW Jumps 25.83 Points, to 2,519.77 Wiggins, Phillip H.. New York Times. (Late Edition (East Coast)). New York, N.Y.: Jul. 29, 1987. p. D.1.*

* cited by examiner

*Primary Examiner*—Frantzy Poinvil
*Assistant Examiner*—Clement B. Graham
(74) *Attorney, Agent, or Firm*—David E. Boundy

(57) ABSTRACT

Systems and methods for providing traders an opportunity to improve prices for an item trading in an active market are provided. After a trader HITS or LIFTS a bid or offer, a market becomes active. When the market is active, traders can submit orders that improve on the price of the current market price of an item. Whenever a price improvement order is currently available for use in a transaction order, a price improvement indicator is displayed to indicate to other traders that price improvement is occurring. When a price improvement order is used to fill a transaction order, a portion of the difference between the market price and the price improvement price may be divided between the trader associated with the price improvement order, the trader associated with the transaction order, and the system host.

41 Claims, 8 Drawing Sheets

FIG. 2A

PRICE IMPROVEMENT IN AN ACTIVE TRADING MARKET

BACKGROUND OF THE INVENTION

The present invention relates to systems and methods for providing trading systems, and more particularly to trading systems that allow traders to improve prices in an active trading market.

Electronically based trading systems have gained widespread popularity over the years. Such trading systems are frequently used for trading items ranging from financial instruments (such as stocks, bonds, currency, futures, contracts, etc.) to used household goods (such as old records, antiques, etc.). In many of these trading systems, bid/offer-hit/lift processes are used to negotiate a sale of a given item. In connection with such processes, bids and/or offers for items are entered into a trading system and a hit or take is submitted in response to a bid or offer, respectively, to agree to a sale, or a purchase.

A typical exchange that uses bid/offer-hit/lift process is the NASDAQ Stock Market. In the NASDAQ, traders are able to submit bids/offers to a market specialist. The market specialist examines the bids/offers received and sets a price for buying and selling a particular share. For example, assume that the market specialist is collecting offers for a particular stock. After the specialist receives all the offers, the trade closes and the specialist may pick the lowest priced offer as the selling price. Thus, every offer submitted without a limit order is sold at that price. One disadvantage of this process is that the sellers cannot improve the price of their shares during an active trade. That is, when the sellers submit their offers to the market specialist, they cannot submit an improved offer until the next open trade. In addition, these sellers are not informed of the market price until after the market specialist selects a price. Thus, sellers may not be provided with the opportunity to gain improved prices over the current market price while the trade is active.

While there are markets that provide substantially direct trading between buyers and sellers, these markets do not provide an opportunity for buyers and sellers to improve prices on an actively traded item. Rather, these markets require traders to submit improved price orders in inactive markets.

Traders may want to submit price improved orders on an item currently being traded in a particular market. Traders may not want to wait until the trade closes before they can submit a bid. Accordingly, it is an object of this invention to provide systems and methods for enabling traders to improve the current market price for a selected item in an active market. In particular, price improvement facilitates trading because the financial incentive for trading with price improvement benefits both the seller and the buyer.

SUMMARY OF THE INVENTION

This and other objects of the present invention are accomplished with the principles of the present invention by providing a trading system that allows traders to buy and/or sell items with price improvement and to submit price improved bids and/or offers.

Price improvement, in accordance with the present invention, enables one or more traders to improve on an existing market trading price. For example, consider a market in which several buyers and sellers are submitting bids and offers for a selected item at a predetermined price. Then one of those traders hits or lifts a bid/offer posted by another trader, thereby activating the active trader's side of the market for that item. The price at which the trader hit or lifted the bid becomes the "touch" price of the market. The touch price is the active market price for a selected item. Once a trade has been initiated, other traders may submit orders that improve on the touch price. When a trader submits a price improved order on a selected item, that trader may "jump in front" of other traders in a buying or selling stack. When an order is put on top of the stack, that order is in position to be executed (e.g., used to fill an order) first when a buyer decides to buy, or a seller decides to sell. A stack lists various order sizes for a particular item, and is typically arranged according to a predefined set of parameters.

Traders can submit price improvement orders that improve on the touch price by a predefined increment. The present invention enables a user to improve prices at non-traditional increments. Markets typically trade goods at prices that can be exchanged in standard increments. For example the two-year United States government bond may trade at standard increments of $\frac{1}{4}$ of $\frac{1}{32}$ of a percentage point of a nominal value. One embodiment of the present invention enables a trader to submit a price improved order having a price that increases/decreases the touch price in some ratio smaller or other than the standard increment.

The present invention also allows traders to price improve an item at price improvement levels. This allows traders to select among different aggressive price improvement increments for price improving a bid, offer, buy price, or sell price. In a buying/selling market, when a trader that submits an order with a price improvement level, the order improves on the touch price by that price improvement level. If desired, the trader can choose a BEST price improvement level. Submitting an order with a BEST price improvement level may automatically allow the order to jump in front of other prices in the market, including other price improved prices.

The present invention also provides a feature that may limit the maximum increment size of improved price orders. The delta (e.g., difference) between the touch price and the price improved price should be less than a maximum delta set by a trading system. If the delta is too big, then the trader's price improvement order is rejected. The maximum delta feature may be useful for preventing mistakes in which a trader may submit an erroneous order.

When traders begin price improvement of an item in an active market, a specified indicator may be displayed in a display screen to indicate to all traders participating in that market that price improvement is commencing. The indicator shows that a trader is trading a publicly known number of selected items at a price improved over the original first trader's price. Market participants, except the trader that submitted the price improvement order, may not be informed of the price of any price improved items listed in the stack. Market participants do know, however, that at least one item in the stack is price improved over the touch price. Therefore, if a trader places an order for at least the number of the items displayed on top of the stack, that trader will get that order at the touch price with price improvement.

When a trade is executed based on a price improvement order, the buyer and the seller may each receive a predetermined percentage (e.g., about half) of the difference between the touch price and the improved price. In addition, the system host (e.g., broker) may charge a nominal fee for providing the price improvement service.

The trader that initiated the first trade is awarded priority rights for activating a market. Priority rights in this invention provide the first trader with an option to "hold up" the market after the first trader's order is cleared. That is, the trader is provided an opportunity to submit an order, if desired, before the system automatically proceeds down the stack to fill additional orders. Thus, priority rights may provide an incentive for a trader to initiate trading.

The present invention also allows traders to submit price improved bids and offers. That is, traders can submit price improved bids and offers without having to buy or sell items substantially immediately.

Thus, this invention provides an environment in which traders can submit competitive prices during an active market. Because price improvement enables a trader to post a price that can obtain "priority" over other traders in the market, this invention advantageously provides an incentive for traders to trade their goods at more competitive prices.

BRIEF DESCRIPTION OF THE DRAWINGS

The above and other objects and advantages of the invention will be apparent upon consideration of the following detailed description, taken in conjunction with accompanying drawings, in which like reference refers to like parts throughout, and in which:

FIG. 2A is an illustration of another dialog window that may be generated in accordance with certain embodiments of the present invention;

DETAILED DESCRIPTION OF THE INVENTION

Figure 1:
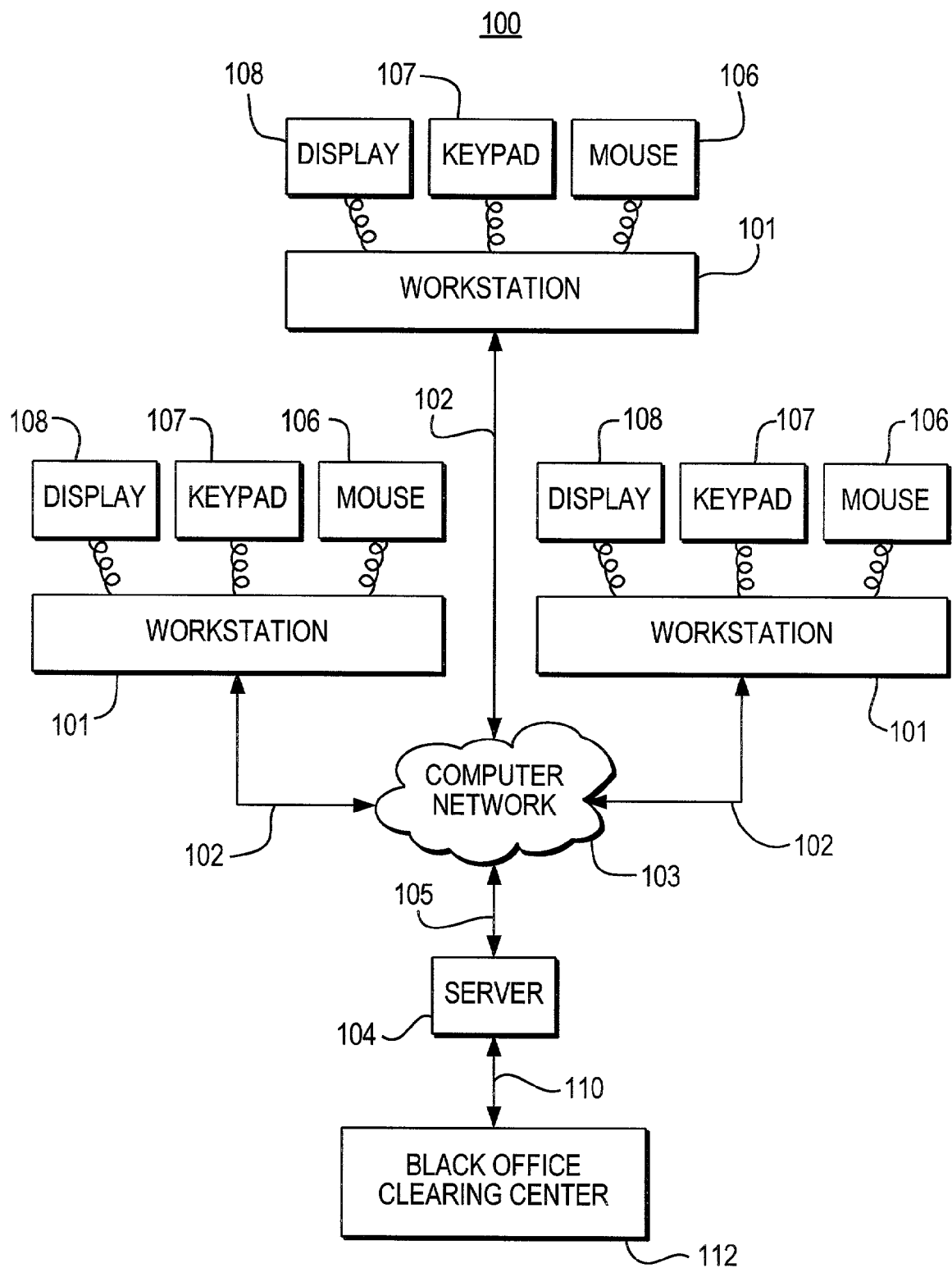
FIG. 1 is a block diagram of a system that may be used to implement the processes and functions of certain embodiments of the present invention.

Referring to FIG. 1, an exemplary system 100 for implementing the present invention is shown. As illustrated, system 100 may include one or more trading workstations 101 that may include a mouse 106, a keypad 107, and a display 108. Workstations 101 may be local or remote, and are connected by one or more communications links 102 to a computer network 103 that is linked via a communications link 105 to a server 104.

In system 100, server 104 may be any suitable server, processor, computer, or data processing device, or combination of the same. Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc. Each workstation enables a participant to engage in the trading process. Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same.

A back office clearing center 112 may also be connected to server 104 of the trading system via communications link 110. Clearing center 112 may be any suitable equipment, such as a computer, or combination of the same, for causing trades to be cleared and/or verifying that trades are cleared. If desired, server 104 may contain multiple processors.

Figure 2:
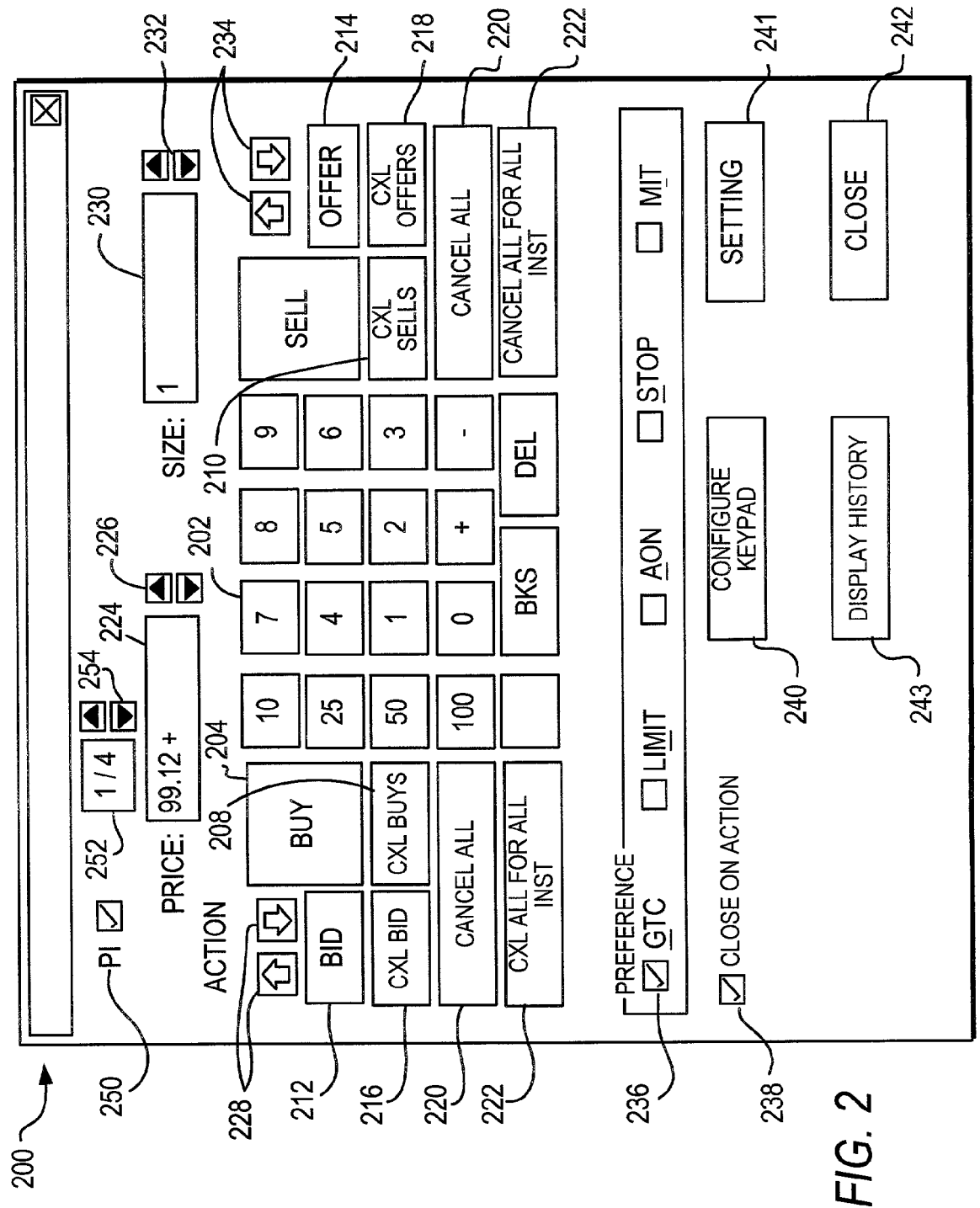
FIG. 2 is an illustration of a dialog window that may be generated in accordance with certain embodiments of the present invention.
Figure 3:
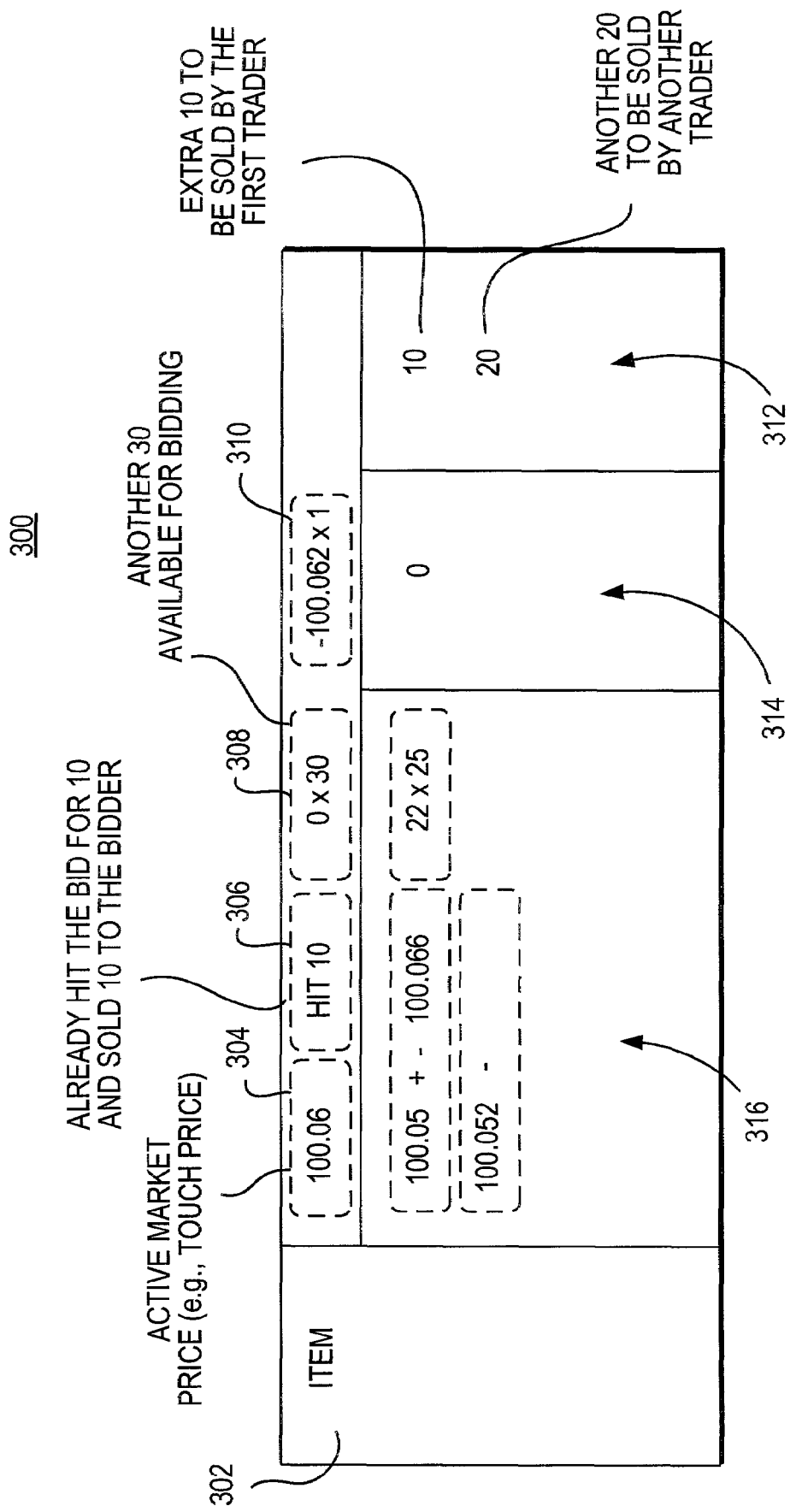
FIG. 3 is an illustration of a market cell that may be generated in accordance with certain embodiments of the present invention.
Figure 4:
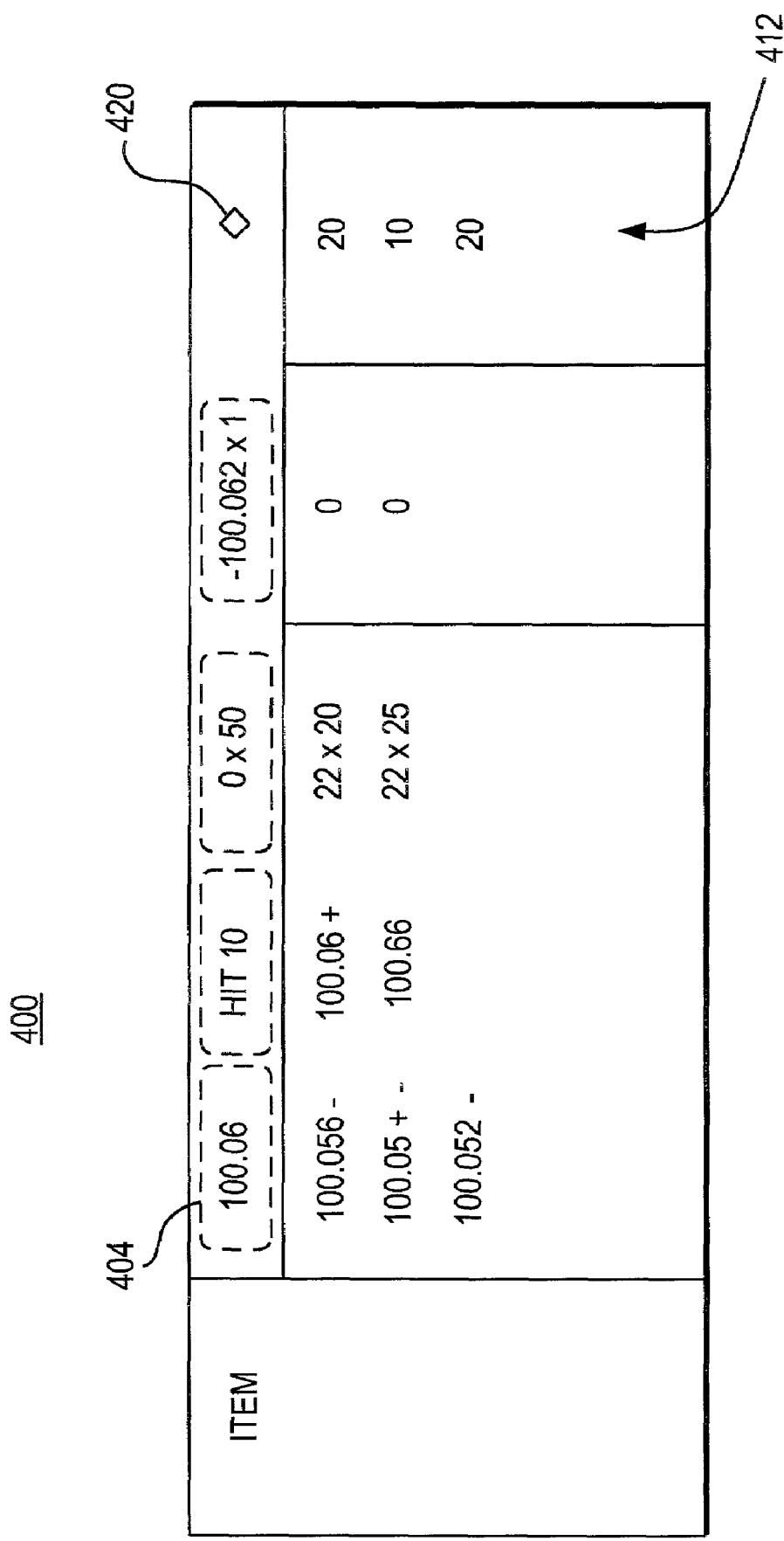
FIG. 4 is an illustration of a market cell showing price improvement that may be generated in accordance with certain embodiments of the present invention.

FIG. 2 illustrates one embodiment of a graphical interface for submitting trading commands using, for example, a workstation as shown in FIG. 1. As shown, the graphical interface comprises a dialog window 200 with various buttons and entry fields 202-254. Using these buttons and entry fields, a trader may submit a bid command, an offer command, a buy command, or a sell command for an item corresponding to a market cell. A market cell is illustrated in FIGS. 3 and 4. Preferably, each traded item uses a unique dialog window 200. Dialog window 200 may be opened automatically and/or manually before, during, and/or after a trade, and may allow a trader to submit a trade command at any time. The dialog window may be repositioned on a trader's display and/or fixed in place. The trader, preferably, will keep the window associated with a particular instrument below the market cell 100 for the same tradable item. The number of dialog windows 200 that can be kept open at any one time is preferably unlimited.

As shown in FIG. 2, dialog window 200 may comprise a variety of on-screen buttons and entry fields. Generally, a button, as displayed in box 200, may be "pushed" by placing a pointing device's pointer over the button and pressing a switch on the pointing device, as is commonly known in the art. At the center of window 200, a numeric keypad 202 may be displayed. The numeric keypad 202 may provide buttons for numbers zero through nine, and may contain buttons for numbers ten, twenty-five, fifty, and one hundred or any other suitable or desirable values. The numeric keypad 202 may also contain a plus button ("+"), a minus button ("−"), a decimal point button ("."), a backspace button ("BKS"), and a delete button ("DEL").

In addition to displaying a numeric keypad as described above, dialog window 200 may also provide a user with a buy button 204, a sell button 206, a cancel buys button 208, a cancel sells button 210, a bid button 212, an offer button 214, a cancel bids button 216, a cancel offers button 218, cancel all buttons 220, cancel all for all instruments button 222, a price entry field 224, price up and down buttons 226, bid price up and down buttons 228, offer price up and down buttons 234, a size entry field 230, and size up and down buttons 232. Finally, dialog window 200 may contain a preference field 236 that allows a user to specify preferred types of orders, a close-on-action box 238 that causes dialog window 200 to be automatically closed after specified actions are performed, a configure keypad button 240 that allows a user to arrange the keypad for dialog window 200, a close button 242 that closes the dialog window 200 on demand, a settings button 241, and a display history button 243 that causes a history list of order entries to be display when pressed.

Preference field 236 may be used to indicate the user's preferred trade type and may allow the user to select any type of trade that a particular exchange or trading system supports.

Although FIG. 2 provides specific examples of trade types (e.g., good-till-canceled (GTC), limit, all-or-none (AON), stop, and market-if-touched (MIT)), the invention may be implemented with any type of trade.

Configure keypad button 240 may allow a trader to arrange buttons appearing in dialog window 200 to be anywhere a trader prefers by first pressing the configure keypad button 240, by then dragging the buttons to new positions, and finally by clicking on button 240 again. Also, the configuration or re-configuration of buttons can change the function of those buttons depending on the type of trading desired or what type of item is being traded.

Dialog window 200 also may include price improvement field 250. Price improvement box 250 may be selected by a user by moving a pointer over box 250 and pressing a button. As illustrated in FIG. 2, price improvement is active because box 250 contains a checkmark. When price improvement box 250 is selected, a trader may be able to submit price improvements orders for items traded in a particular market.

If price improvement is enabled, a trader may enter an increment (e.g., a fraction) suitable for price improvement in field 252 using up and down buttons 254. The number provided in field 252 may be used as an increment to improve the price of an known price currently traded in a market. For example, if a current selling price is 106.06, a trader may improve the price by adjusting field 252 such that a price improvement of 106.056 is obtained.

A user may submit price improvement orders using dialog window 200. In particular, a user may enter desired values in price improvement field 252 and size field 230 when executing price improvement orders. The value entered in price improvement field 252 represents the fraction of a market's standard increment that is used to provide price improvement of a touch price. (A touch price is price at which a trader initiated trading for a selected item.) For example, assume that the user is trading in a market that provides standard increments of $1/128$ of a point (e.g., "1"). Depending on the value entered in field 252, the user can improve prices at a ratio of the standard increment. Thus, if a user enters $1/4$ in field 252, the user has configured dialog window 200 to submit an order that has a price improvement of $1/512$ (i.e., $1/4$ of $1/128$) of a point. Hence, this provides the present invention with the ability to provide non-traditional increments to enable price improvement.

In addition, the user may also select a desired number of selected items for trading by entering a value in size field 230. After a user has entered desired values in price improvement field 252 and size field 230, the user may submit an order by pressing, for example, buy 204, sell 206 or any other suitable key in dialog window 200. Once the order is submitted and approved, the price improvement order is displayed in a market cell for a particular market.

Persons skilled in the art will appreciate that above description with respect to FIG. 2 is not intended to be an exhaustive description of various features that can be included with dialog window 200. It does, however, discuss many features pertinent to describing the present invention. United States patent application publication No. 2002-0029180 published Mar. 7, 2002, which is hereby incorporated by reference in its entirety, provides a substantial description of dialog window 200.

The present invention also allows traders to price improve an item at different price improvement levels within a defined price range. This provides the traders with an opportunity to submit bids, offers, buy orders, and/or sell orders that enables a trader to "jump in front of" other traders by improving on an existing price. As defined herein, a price can be associated with a sell price, a buy price, a bid price, and/or an offer price. For example, assume that the defined price range for an item is 1.00 (i.e., the price of an item can vary in increment of 1.00 such as 3.00, 4.00, 5.00, etc.). Also assume that traders can price improve at levels such as BEST, 0.25, 0.5, and 0.75, which is shown in FIG. 2A at price improvement box 262.

If the trader submits an order with a price improvement level of BEST, the system submits a price improved price that improves on the best price currently available in market. The BEST price improvement level allows a trader to automatically jump in front of the other traders. The BEST price improvement order may increase the order price at any suitable improvement level (e.g., 0.25, 0.50, 0.75, etc.) that is more aggressive (i.e., has a better price) than the price at the top of the stack. The BEST price improvement may increase the order price up to a predetermined limit.

If the trader submits an order with a price improvement level of 2/16, then the system submits a price improvement bid that improves on touch price by 2/16th. This type of price improvement submission, however, may not put the trader in front of the stack because the submitted price may not improve on the price listed at the top of the stack.

Figure 2A:
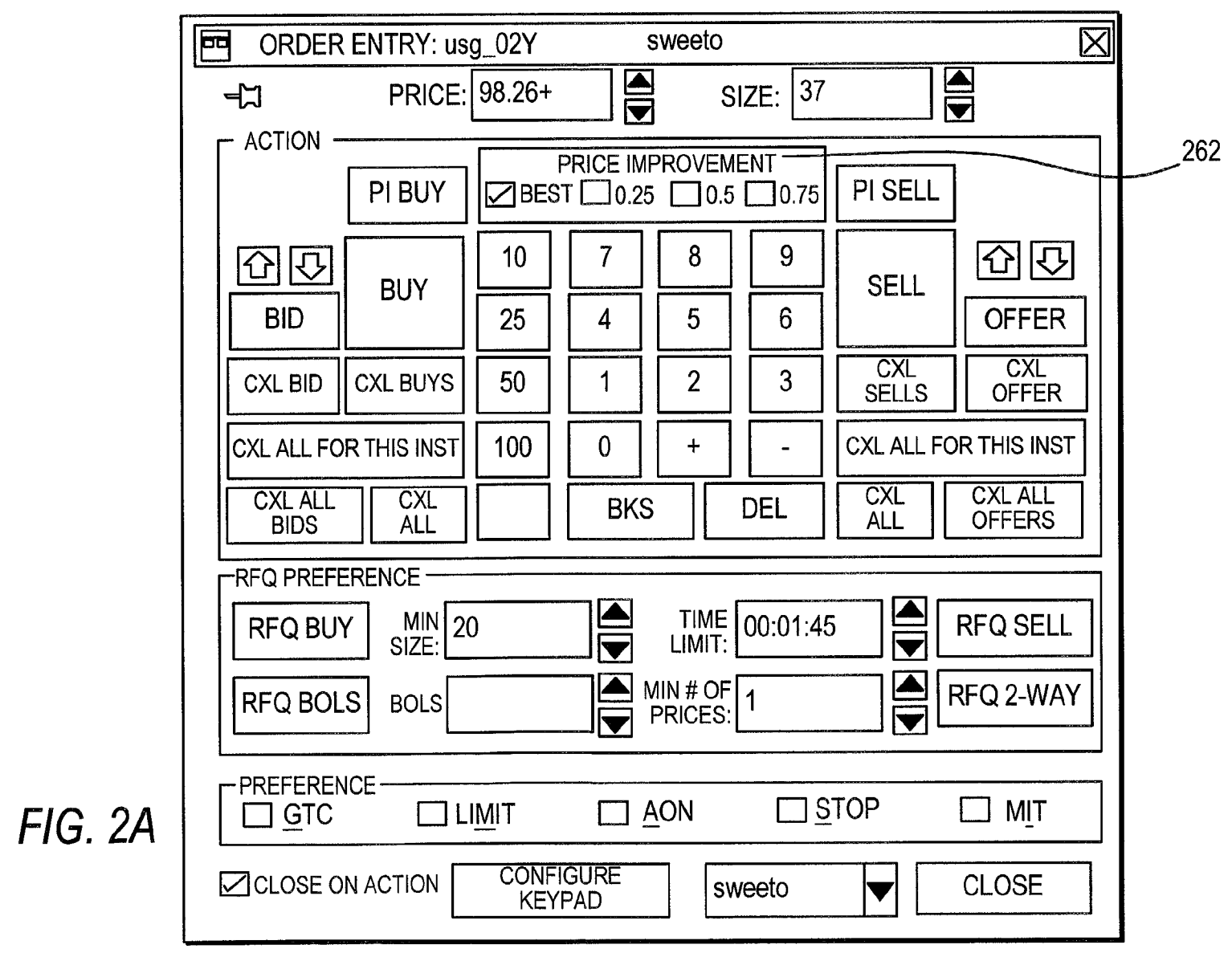

Persons skilled in the art will appreciate that the above discussion related to FIGS. 2 and 2A can also be applied to price improving bids and offers in a non-trade state. That is, instead of price improving a buy or sell price, a trader can price improve on a bid or offer. Traders can use, for example, the dialog windows of FIGS. 2 and 2A to price improve bids and/or offers at non-standard increments and at different price improvement levels.

Figure 5:
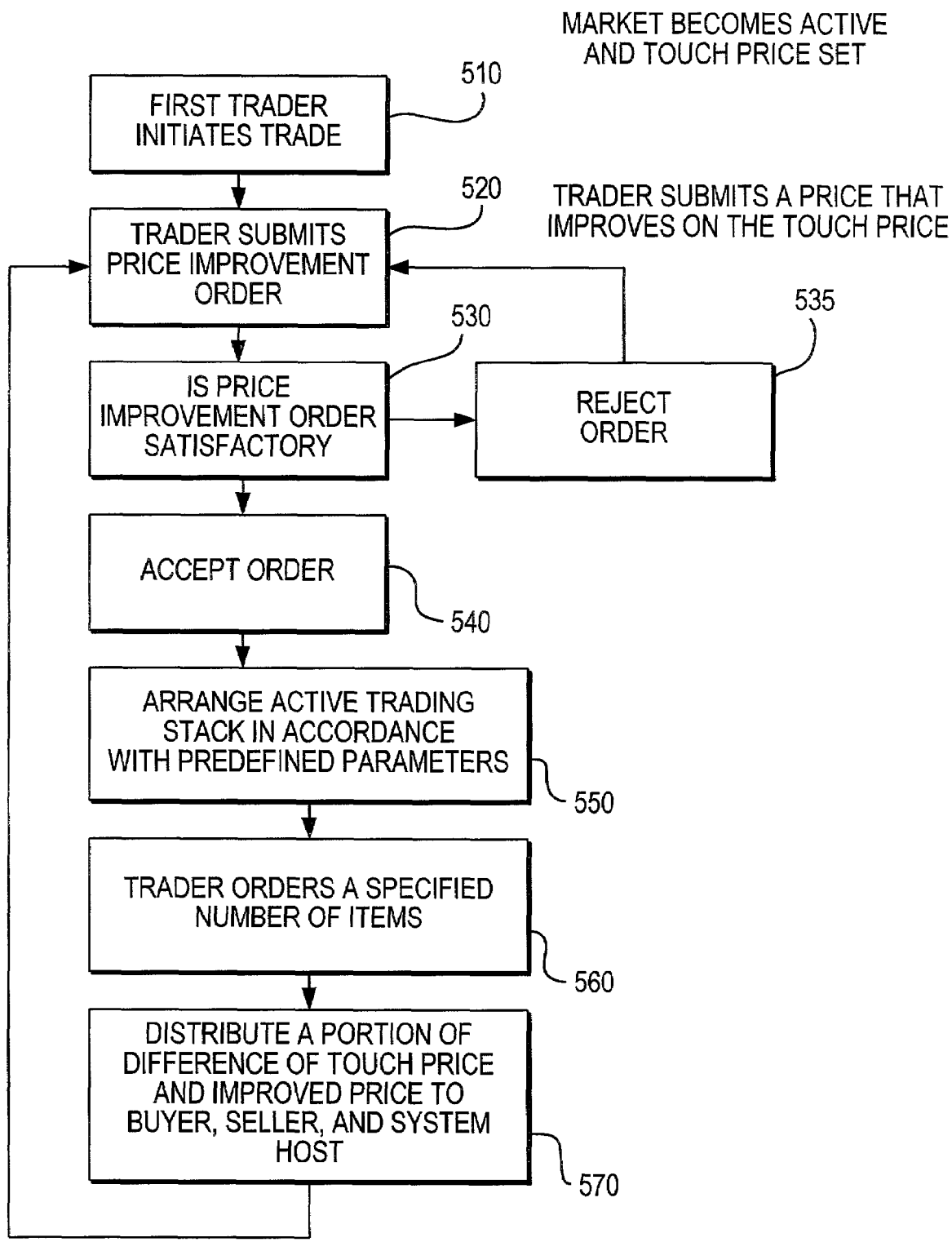
FIG. 5 is a flow diagram of a main process that may be used to provide price improvement in accordance with certain embodiments of the present invention.
Figure 6:
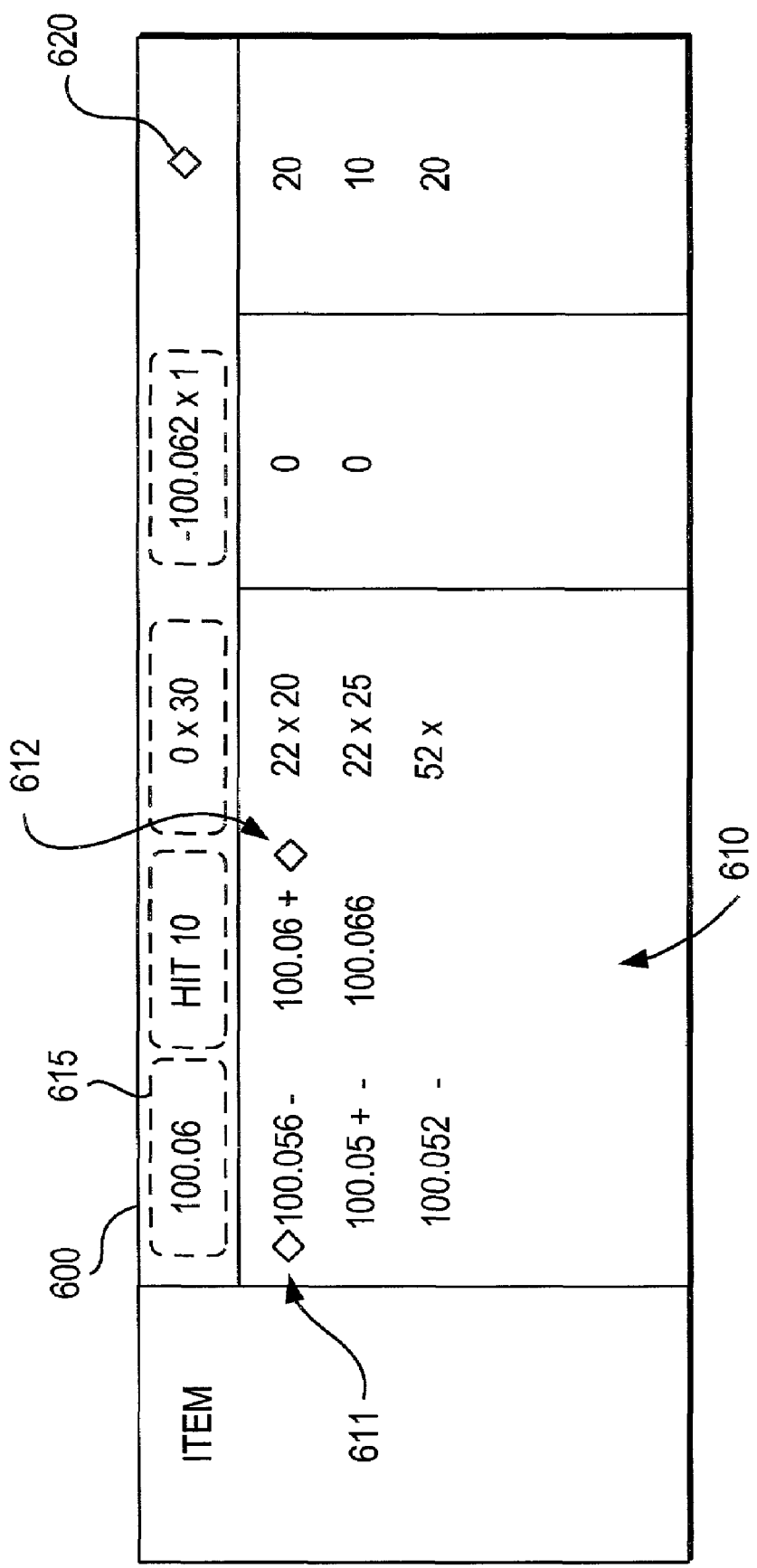
FIG. 6 is an illustration of a market cell in which unfilled price improved orders from the trade state are about to be returned to a bid/offer state in accordance with certain embodiments of the present invention.
Figure 7:
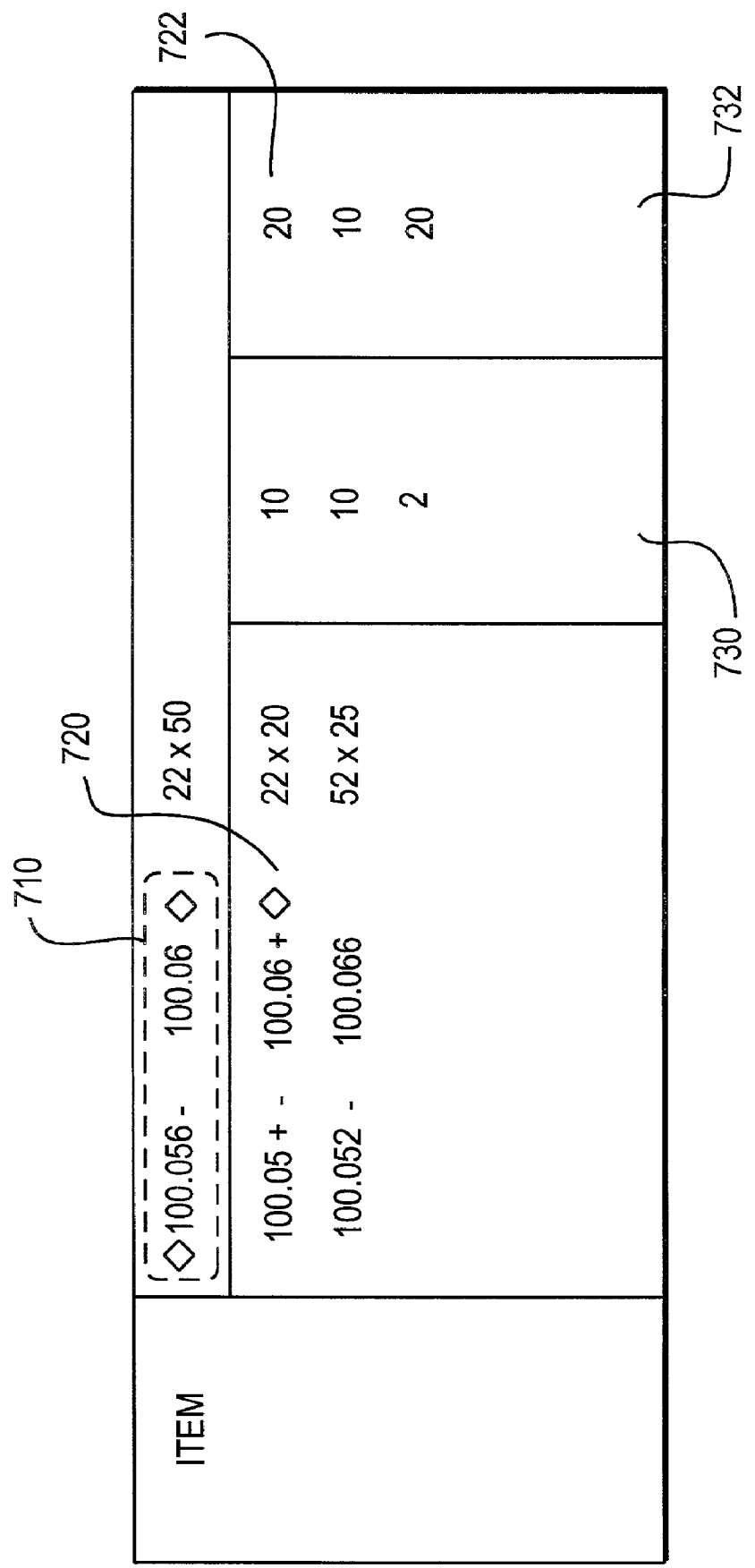
FIG. 7 is an illustration of a market cell in which price improvement is applied to a bid/offer state in accordance with certain embodiments of the present invention.

With reference now to FIGS. 3 and 4, price improvement is described in context of market cells 300 and 400 for a selected item. FIGS. 3, 4, and 5 are described primarily in the context of a trade state in which traders are actively buying and selling an item by submitting buy and sell orders. FIGS. 6 and 7 are described primarily in context of a bid/offer state in which traders submit bids and offers for an item. Persons skilled in the art will appreciate that the price improvement features of the present invention can be used in conjunction with trade states and bid/offer states.

FIG. 3 shows an exemplary market cell 300 in which a trader has initiated trading in accordance with the principles of the present invention. Market cell 300 shows that the user is participating in a market in which selected item 302 is being traded. Selected item 302 may be any suitable type of commodity such as, for example, securities, bonds, coupons, etc. Price 304 indicates the current selling and/or buying price of selected item 302. Trade status 306 provides an indication of what type of trading activity is taking place with respect to selected item 302. Item indicator 308 provides an indication of the quantity of selected item 302 available in the market. If, for example, sellers are operating in the active side of the market, the item indicator 308 informs market participants the total number of items 302 that are available for sale in the market. Market ticker 310 provides an indication of the price at which selected item 302 was previously being bought or sold. Seller stack 312 informs market participants the quantity of selected items 302 a particular seller is prepared to sell. Likewise, buyer stack 314 informs market participants the quantity of selected items 302 a particular buyer is prepared to buy. Market spread indicator 316 provides information regarding the depth of the market (i.e., the price and quantity of items available in the market, at prices different to the touch price).

As discussed herein, an improved price is a price that is better than the touch price. A better price, however, is dependent on whether the participant is a buyer or seller. If the participant is a buyer, then a better (more aggressive) price is higher. If the participant is a seller, a better (more aggressive) price is lower. Persons skilled in the art will appreciate that both the buyer's market and the seller's market can be active simultaneously. Persons skill in the art will also appreciate that "improved prices" can be dependent on a particular type of market. In a yield market, for example, a seller's action can be improved on by submitting a price higher then the touch price.

As mentioned above, FIG. 3 provides an illustrative display of market cell 300 after a trader initiates a trade in a market. In connection with the following discussion of FIG. 3, sellers are participating in the active side of the market. Therefore, the discussion of FIG. 3 is presented from a sellers point-of-view. This does not suggest that the present invention is limited to only improving selling prices. The present invention enables a trader to improve both buying and selling prices.

Prior to the initial trade, market participants are aware of the bids and offers available in the market for selected item 302. If desired, a trader may "HIT" a bid or "LIFT" an offer to start trading. FIG. 3 shows that a trader "HIT" a bid, as indicated by trade status 306, at price 304. In this example, assume that this seller HIT a bid for 10 million (hereinafter "M") by selling 20 m into that bid. Because this trader is selling 10 m more items than the buyer bid, the extra items are displayed in seller stack 312. After this trade commences, all market participants are aware that a seller sold 10 m selected items 302 at price 304. Market participants also know that there is an additional 30 m selected items 302 available for purchase, as indicated by item indicator 308. There are 30 m items 302 available because another trader (or the first trader) has submitted an order to sell 20 m items 302 at a predetermined price.

After a trader initiates trading for selected item 302, other traders may submit price improved orders that improve prices with respect to the touch price. FIG. 4 illustrates a market cell 400 in which price improvement is commencing in accordance with the principles of the present invention. Market cell 400 has substantially all the same features of market cell 300. In addition to the features of market cell 300, market cell 400 displays price improvement indicator 420 when price improvement is taking place in the market. Price improvement indicator 420 may be any suitable distinguishing character such as, for example, a diamond, a carrot, text (e.g., PI) or other distinguishing mark. Price improvement indicator 420 informs all market participants that at least one seller is selling a specified number of items at an improved price. That is, the seller is selling items slightly cheaper than price 404. But market participants (except the trader who submitted a price improved order) do not know how much cheaper the items are being sold.

As shown in FIG. 4, a second trader placed a price improved order for 20 m items. This 20 m is shown at the top of seller stack 412, which is on top of the first trader's 10 m. Price improvement, in accordance with the present invention, enables the second trader to submit an order that takes precedence over the first trader because the second trader is offering items at an improved price. Thus, when a buyer decides to purchase a specified number of items, the second trader's items are used first to fill the buyer's order. For example, if a buyer decides to place a relatively small order, this provides an incentive for sellers, especially when there are several sellers, to submit price improved orders.

During price improvement, market participants may not be aware which items in stack 412 are price improved. Granted, a price improved item may be displayed on the top line of the stack (when the stack is arranged according to price priority) when price improvement display 420 is displayed. This is because the seller is offering the cheapest price. But most market participants do not know if other items in stack 412 are price improved.

Although FIG. 4 shows three orders of items in stack 414, the present invention is not limited to permitting only one other trader to submit a price improved order. Any suitable number of traders may submit price improved orders when the trade is working. If desired, the same trader may submit several price improved orders in the same market. For example, the same trader may use different price improvement levels to submit different price improved orders.

One embodiment of price improvement process 500 that may be used to provide price improvement in accordance with the principles of the present invention is illustrated in FIG. 5. As shown in FIG. 5, process begins at step 510 when a trader initiates (e.g., sells or buys an item). It should be noted that prior to step 510, traders are posting bids and offers for a particular item, thereby attempting to provide a favorable trading environment to initiate trading.

A trader that initiates trading in a market may be awarded priority rights during an active trade. Priority rights may provide the first trader with the ability to "hold up" the market for a specified period of time such that the first trader has the option to sell more items. This "hold up" option is advantageous because it enables the first trader to submit a new order after the first order is cleared. Regardless of whether the first trader takes any action, the first trader's rights may be revoked after a predetermined period of time.

After a trader initiates a trade (e.g., trader HITS a bid as in FIG. 3), process 500 proceeds to step 520. At step 520, a new trader may submit a price improvement order using, for example, dialog window 200 of FIG. 2. As mentioned above, any suitable number of traders may submit price improvement orders at any time during process 500. That is, a trader may submit a bid at any time trading is open in that particular market. Moreover, a trader may submit more than one price improvement order for a particular market.

After a price improvement order is submitted, it may be scanned to determine whether it is acceptable before it is displayed in a market cell. At step 530, process 500 may determine if the proposed price is acceptable. In particular, the difference between the price improvement price and the touch price (e.g., price at which trading was initiated) is compared to a maximum delta limit. Maximum delta limits are imposed to minimize potential trader mistakes. If a trader submits a price improvement order that aggresses too far from the touch price, the order may be rejected at step 535. If the price improvement order is acceptable, it is accepted at step 540. An accepted order is an order that is deemed to be acceptable by the system processing the orders. Once accepted, the trader's order may be displayed in a market cell (e.g., market cell 400 of FIG. 4). In addition, if the price improvement order is accepted, a price improvement indicator may be provided in a market cell to indicate to market participants that price improvement is occurring in a particular market.

After a price improvement order is accepted, the process determines how the order is displayed in a market cell. At step 550, the process arranges the accepted order in an existing stack according to a set of parameters. For example, new orders may be arranged according to price of the order and time the order was submitted. The better the price, the higher in the stack the order is placed. If an order includes the best price, then the order is place in the top of the stack. If an order has the same price as an existing order, then the order is arranged according to the time it was it was submitted by the trader. Older orders may have precedence over newer orders (i.e., older orders are arranged above newer orders having the same price). The aggregation of orders enables the trading system to determine which orders should be used first to fill a buyer's order. Thus, orders on top of the stack are used first and other orders are used in a top-down approach.

At step 560, when a buyer places a buy order for a specified number of items, a trading system automatically fills that buy order with accepted orders in the prioritized aggregated stack. Accepted orders that are used to fill a buyer's order are cleared and the remaining orders are pushed up the stack.

At step 570, if a buyer bought a price improved order (e.g., a price improved order), the process determines how the difference between the touch price and the improved price is distributed. In general, the process may determine the midpoint of the difference and provide about one half of the difference to both the buyer and seller, respectively. The system host may charge both the buyer and the seller a nominal fee for providing this service (e.g., price improvement trading). Persons skilled in the art will appreciate that the difference may be divided up in any suitable manner. For example, the fee charged by the system host may also vary.

The process may determine how to distribute the difference with respect to each order cleared from the stack. For example, assume that a buyer placed an order to buy 30 million items (hereinafter million is referred to as "m") in a market that had a selling stack of at least a 20 m order and a 10 m order. To fill the buyer's order, both the 20 m and 10 m orders are used. But the prices for the 20 m and the 10 m items may be different due to price improvement on only one of them. With respect to the 20 m order, an improvement in price may be distributed between the buyer and the seller of the 20 m order. With respect to the 10 million order, there may be no improvement between prices or may be a different improvement than the improvement for the 20 m order. This different improvement may be distributed between the buyer and the seller of the 10 m lot. After the difference in price is distributed to the respective parties, process 500 may return to step 520.

Persons skilled in the art will appreciate that certain steps of process 500 may be repeated while the market is active. For example, several traders may submit new orders and buyers may place orders any time the market is active.

The present invention allows traders to submit price improved bids and offers without having to buy or sell items substantially immediately. FIG. 6 shows an illustrative display of market cell 600 in which bids and offers worse than the touch price may be present. A price improved bid 611 and price improved offer 612 may be displayed in a stack 610 below and above the touch price trading 615. Touch price 615 itself may be subject to price improvement in the trading state as indicated by indicator 620. If more than one price improvement bid or offer is displayed in bid/offer stack 610, then the best bids and offers are aggregated at the top of their respective stacks. Likewise, as described above, all bids and offers may be prioritized according to price.

FIG. 7 shows illustrative market cell 700 in which a bid/offer state is being implemented in accordance with the principles of the present invention. Price improvement can also be present when unfilled price improved orders from the trade state are returned to a bid/offer state in accordance with the principles of the present invention. Certain price improvement orders may not be filled in the trade state. Such price improvement orders may be returned above the bid/offer stack 720 as the best bid and offer display 710. In addition, the price improvement indicator may also be displayed to indicate that a bid or offer is available that is price improved on the touch price. Moreover, any order properties such as preferences (e.g., Good until cancelled, Limit, etc.) may be carried over to the bid/offer state.

For example, price improved bid and offer 710 indicates that an improved bid and offer is available. In particular offer 720 is available at a price improved offer (e.g., an offer that improves on 100.06) that has size 722 (e.g., 20). Each trader participating in market cell 700 knows that is an offer with price improvement. The traders also know the size of the price improved offer, but other traders may not know whether other sizes in the size breakdown stacks 730 and 732 are associated with a price improved offer or bid.

Thus, systems and methods for providing price improvement are provided. One skilled in the art will realize that the present invention can be practiced by other than the described embodiments, which are presented for purposes of illustration and not of limitation, and that the present invention is limited only by the claims which follow.

The invention claimed is:

1. A method for providing price improvement on an item being traded in an active market, wherein said active market is a market where said item is actively being traded, said method comprising:
   providing a touch price for said item;
   electronically receiving at least one price-improved order having a price and a size, wherein said at least one price-improved order improves on said touch price;
   displaying a price improvement indicator while said at least one price-improved order is available for trade in said active market;
   prioritizing each said at least one price-improved order based on predetermined criteria;
   receiving at least one transaction order, wherein said at least one transaction order is an order to buy or sell said item;
   filling said at least one transaction order based on the prioritization of said at least one price-improved order; and
   electronically distributing at least a portion of the difference between said touch price and said price of
   said at least one price-improved order used to fill said at least one transaction order to:
   a trader associated with said at least one price-improved order; a trader associated with said at least one transaction order; and a system host.

2. A method comprising the steps of:
   in an electronic trading system designed to trade financial instruments, generating data designed to cause presentation to traders of one or more orders in a form executable by the traders to whom the orders are presented, the presented orders being orders to buy and/or sell a financial instrument at a specified price in a specified quantity, the electronic trading system establishing a standard price increment by which prices of orders differ;
   receiving a price-improved order from a trader, the price-improved order being either (a) an offer to sell at price lower than the best offer to sell currently presented with a price and quantity, or (b) a bid to buy at a price higher than the best bid to buy currently presented with a price and quantity; and
   distributing data for presentation to traders, the distributed data indicating the availability of the price-improved order to be traded, but withholding the precise price of the price-improved order.

3. The method of claim 2, wherein the price-improved order includes a specified quantity for said item.

4. The method of claim 3, wherein the quantity for the price-improved order is presented to the traders to whom the price-improved order is presented.

5. The method of claim 2, wherein the price-improved order has a price set relative to a price of an order at a standard-increment price currently pending.

6. The method of claim 2, further comprising:
providing an opportunity to enter a price-improved order into the electronic trading system to only traders that entered a previous order that has been executed, the opportunity being open within a specified time after execution of the previous order.

7. The method of claim 2, further comprising the step of:
for a period of time following execution of the price-improved order, providing priority rights to a trader of a transaction executed on the price-improved order, the priority right providing an opportunity to temporarily stop orders from executing while the trader with the priority right has an exclusive opportunity to submit a new order.

8. The method of claim 2, further comprising the step of:
allowing a trader to submit the price-improved order at a variable price that floats at a user-determined increment relative to the best offer or best bid then pending during the time the price-improved order remains available to be traded.

9. The method of claim 2, wherein
the price-improved order is at a price improved relative to another price-improved order that is at a price outside the standard price increment.

10. The method of claim 2, wherein said predetermined price improvement level comprises a level that improves on the price of the last-executed transaction by a user-defined quantity.

11. The method of claim 2, wherein the price-improved order includes an increase in bid purchase price relative to a previously-executed transaction.

12. The method of claim 2, wherein the price-improved order includes a decrease in offered sale price relative to a previously-executed transaction.

13. The method of claim 2, wherein the price-improved order improves on a price by offering a decreased offer price relative to a pending offer to sell.

14. The method of claim 2 further comprising the step of:
validating the price-improved order by comparing its price to a price of a recently-executed transaction.

15. The method of claim 2, wherein:
the price-improved order is at a price different from the best offer or best bid pending at the time the price-improved order is entered by an amount smaller than the standard price increment.

16. The method of claim 2 further comprising the step of:
displaying a visual price improvement indicator on a video screen of a trader to whom the price-improved order is presented, the visual price-improvement indicator being designed to indicate to the trader that the price-improved order is available to be traded.

17. The method of claim 2, further comprising the step of:
prioritizing the price-improved order for execution according to price of the price-improved order.

18. The method of claim 2, further comprising the step of:
prioritizing the price-improved order for execution according to a time at which the price-improved order was received.

19. The method of claim 2 further comprising the step of:
executing a trade of the price-improved order at a price at a predetermined difference from the price of the price-improved order.

20. The method of claim 2 further comprising the step of:
removing one of said at least one price-improved order when all of said size of said at least one price-improved order is used to fill said at least one transaction order.

21. The method of claim 2, further comprising the step of:
for at least some of said price-improved orders, displaying a quantity of the at least some price-improved order.

22. A tangible memory having embedded thereon programs designed to cause a computer to:
generate data in an electronic trading system designed to trade financial instruments at prices being multiples of a standard price increment by which prices of orders differ, the data designed to cause presentation to traders of one or more orders in a form executable by the traders to whom the orders are presented, the orders to be presented being orders to buy and/or sell a financial instrument at a specified price in a specified quantity;
receive at least one price-improved order from a trader, the price-improved order having a price and a quantity, the price-improved order being either (a) an offer to sell at price lower than the best offer to sell currently presented with a price and quantity, or (b) a bid to buy at a price higher than the best bid to buy currently presented with a price and quantity; and
distribute data for presentation to traders, the distributed data indicating the availability of the price-improved order to be traded, but withholding the precise price of the price-improved order.

23. The tangible memory of claim 22, wherein the price-improved order includes a specified quantity for said item.

24. The tangible memory of claim 22, wherein the quantity for the price-improved order is presented to the traders to whom the price-improved order is presented.

25. The tangible memory of claim 22, wherein the price-improved order has a price set relative to a price of an order at a standard-increment price currently pending.

26. The tangible memory of claim 22, further comprising programs designed to cause a computer to:
provide an opportunity to enter a price-improved order into the electronic trading system to only traders that entered a previous order that has been executed, the opportunity being open within a specified time after execution of the previous order.

27. The tangible memory of claim 22, having further embedded thereon programs designed to cause a computer to:
for a period of time following execution of the price-improved order, providing priority rights to a trader of a transaction executed on the price-improved order, the priority right providing an opportunity to temporarily stop orders from executing while the trader with the priority right has an exclusive opportunity to submit a new order.

28. The tangible memory of claim 22, having further embedded thereon programs designed to cause a computer to:
allow a trader to submit the price-improved order at a variable price that floats at a user-determined increment relative to the best offer or best bid then pending during the time the price-improved order remains available to be traded.

29. The tangible memory of claim 22, wherein:
the price-improved order is at a price improved relative to another price-improved order that is at a price outside the standard price increment.

30. The tangible memory of claim 22, wherein:
said predetermined price improvement level comprises a level that improves on the price of the last-executed transaction by a user-defined quantity.

31. The tangible memory of claim 22, wherein:
the price-improved order includes an increase in bid purchase price relative to a previously-executed transaction.

32. The method according to claim 22, wherein:
the price-improved order includes a decrease in offered sale price relative to a previously-executed transaction.

33. The tangible memory of claim 22, wherein:
the price-improved order improves on a price by offering a decreased offer price relative to a pending offer to sell.

34. The tangible memory of claim 22, having further embedded thereon programs designed to cause a computer to:
validate the price-improved order by comparing its price to a price of a recently-executed transaction.

35. The tangible memory of claim 22, wherein:
the price-improved order is at a price different from the best offer or best bid pending at the time the price-improved order is entered by an amount smaller than the standard price increment.

36. The tangible memory of claim 22, having further embedded thereon programs designed to cause a computer to:
display a visual price improvement indicator on a video screen of a trader to whom the price-improved order is presented, the visual price-improvement indicator being designed to indicate to the trader that the price-improved order is available to be traded.

37. The tangible memory of claim 22, having further embedded thereon programs designed to cause a computer to:
prioritizing the price-improved order for execution according to price of the price-improved order.

38. The tangible memory of claim 22, having further embedded thereon programs designed to cause a computer to:
prioritizing the price-improved order for execution according to a time at which the price-improved order was received.

39. The tangible memory of claim 22, having further embedded thereon programs designed to cause a computer to:
execute a trade of the price-improved order at a price at a predetermined difference from the price of the price-improved order.

40. The tangible memory of claim 22, having further embedded thereon programs designed to cause a computer to:
remove one of said at least one price-improved order when all of said size of said at least one price improved order is used to fill said at least one transaction order.

41. The tangible memory of claim 22, having further embedded thereon programs designed to cause a computer to:
for at least some of said price-improved orders, display a quantity of at least some price-improved orders.

* * * * *

UNITED STATES PATENT AND TRADEMARK OFFICE
CERTIFICATE OF CORRECTION

PATENT NO. : 7,574,395 B2  Page 1 of 1
APPLICATION NO. : 10/171009
DATED : August 11, 2009
INVENTOR(S) : Michael Sweeting It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2130 days.

Signed and Sealed this

Fourteenth Day of December, 2010

David J. Kappos
*Director of the United States Patent and Trademark Office*